US007128978B2

(12) United States Patent
Sisler et al.

(10) Patent No.: US 7,128,978 B2
(45) **Date of Patent: *Oct. 31, 2006**

(54) GLOSS COATED PAPERS HAVING OPTIMIZED PROPERTIES FOR IMPROVING IMAGE PERMANENCE AND A METHOD OF PRINTING THE GLOSS COATED PAPERS IN AN ELECTROPHOTOGRAPHIC APPARATUS

(75) Inventors: Gordon Sisler, St. Catharines (CA); Guiqin Song, Toronto (CA); Jingsong Tang, New Orleans, LA (US); T. Brian McAneney, Burlington (CA)

(73) Assignee: Xerox Corporation, Stamford, CT (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/992,684

(22) Filed: Nov. 22, 2004

(65) Prior Publication Data

US 2006/0110577 A1 May 25, 2006

(51) Int. Cl.
*B32B 3/00* (2006.01)

(52) U.S. Cl. ...................... 428/532; 428/533; 428/534; 428/536; 428/537.5; 428/195; 430/126

(58) Field of Classification Search ................ 428/532, 428/533, 534, 536, 537.5, 195; 430/126
See application file for complete search history.

(56) References Cited

U.S. PATENT DOCUMENTS

| | | | | |
|---|---|---|---|---|
| 5,087,946 | A * | 2/1992 | Dalal et al. | 399/330 |
| 6,593,255 | B1 * | 7/2003 | Lawton et al. | 442/59 |
| 6,701,637 | B1 * | 3/2004 | Lindsay et al. | 34/71 |
| 6,814,141 | B1 * | 11/2004 | Huh et al. | 166/249 |
| 6,893,789 | B1 * | 5/2005 | Leskela et al. | 430/126 |
| 6,949,289 | B1 * | 9/2005 | Lawton et al. | 428/372 |

* cited by examiner

*Primary Examiner*—Leszek B. Kiliman
(74) *Attorney, Agent, or Firm*—Oliff & Berridge, PLC

(57) ABSTRACT

The present invention generally relates to a gloss coated paper having specific properties for enhanced toner adhesion. The critical specific properties of the paper include the combination of a thermal diffusivity of less than approximately 8.5 $mm^2/s$, a polar liquid contact angle slope of less than approximately −12.0 and a non-polar liquid contact angle slope of less than approximately −5.5. A method of printing gloss coated paper in an electrophotographic apparatus includes forming an image with an electrophotographic toner in the electrophotographic apparatus and transferring the image to the gloss coated paper.

20 Claims, 4 Drawing Sheets

GLOSS COATED PAPERS HAVING OPTIMIZED PROPERTIES FOR IMPROVING IMAGE PERMANENCE AND A METHOD OF PRINTING THE GLOSS COATED PAPERS IN AN ELECTROPHOTOGRAPHIC APPARATUS

BACKGROUND OF THE INVENTION

1. Field of Invention

The present invention relates to an optimum gloss coated paper for improving toner adhesion and a method for forming an image on the optimized gloss coated paper. The gloss coated paper may be ideally used in apparatuses utilizing an electrophotographic process such as a copying machine, printer, facsimile and the like, especially in a color copying machine.

2. Description of Related Art

In an electrophotographic process, a fixed image is formed through a plurality of processes in which a latent image is electrically formed by various means on a photosensitive material utilizing a photoconductive substance. This latent image is developed using a toner and the toner latent image on the photosensitive material is transferred onto a transfer material, such as paper, to manifest a toner image. Then, this transferred image is fixed onto the paper. Recently, owing to the development of apparatuses and the spread of communication networks, electrophotographic processes are used not only in copying machines but also in printers.

For best results in forming an image, gloss coated paper is utilized in the printing process. Gloss coated paper is used most often when printing colors. Different types of gloss coated papers having different characteristics may be used to optimize the final print or copy, depending upon the type of imager being used. For example, caliper (thickness), stiffness, brightness, whiteness, and gloss are some properties that vary with different types of paper. The various combination of these and other properties, as well as other features including, for example, drying time, are considered when choosing an optimum paper for a specific imaging device such as a printer or copier.

More specifically, gloss coated printing papers are characterized by numerous physical and optical attributes. Some of the more critical properties of gloss coated printing papers include area density (grammage), thickness (caliper), surface topography (roughness), gloss, brightness, and ink absorption. To specify a paper having properties that meets all the requirements of a particular printing process as suitable, that is, having a suitable grade of paper, paper properties which contribute to performance and print quality must first be identified. (A grade of paper is a way of ranking paper by certain compositions and characteristics.) Furthermore, a desirable range of values for each of the paper properties must be specified for each selected property.

Determining a desirable range of values for each of the paper properties is typically performed by a trial and error process, sometimes taking over decades to develop. These papers have been developed in this manner for each successive development of printing technology. Examples include specific papers engineered for sheet-fed offset, web offset, gravure, flexo, ink jet, thermal transfer and xerographic printing processes. This successive trial and error process has resulted in each gloss coated paper having their own unique properties resulting in a range of image qualities. However, none of the paper properties of commercially available gloss coated papers have been identified and then optimized for increasing toner adhesion to improve image permanence.

A recent development in printing technology is Digital Color Production Printing (DCPP) using xerography. This refers to 4 or more color xerographic printing at process speeds exceeding 60 pages/minute. DCPP printers are used for commercial print applications, where they typically replace short to medium run offset presses.

The principal substrate used for DCPP, as in general for commercial printing, is coated paper. While there is a clear understanding of coated paper specifications for sheet and web offset printing, there has not been a specification developed for coated papers for xerographic DCPP.

SUMMARY OF THE INVENTION

The present invention addresses these and other needs by providing a paper specification developed for coated papers for xerographic DCPP. The specification defines a set of properties for optimal toner adhesion to gloss coated papers in xerographic DCPP.

Experiments were conducted on approximately 30 commercial gloss coated papers to assess the xerographic DCPP toner adhesion for each paper. As a result, paper specifications for two-sided gloss coated papers for optimal toner adhesion using xerographic DCPP include a grammage between 120–275 gsm, a caliper between 90 and 280 microns, a gloss between 60 and 80 ggu, a PPS between 0.4 and 2.0 microns, a thermal diffusivity (measured at 50° C.) less than 8.5 mm$^2$/s, a polar liquid contact angle slope less than −12.0, and a non-polar liquid contact angle slope less than −5.5.

It is recognized that the thermal diffusivity, the polar liquid contact angle slope and/or the non-polar liquid contact angle slope are critical properties of the optimum gloss coated paper in an embodiment of the present invention.

Although, there are commercial papers that may meet some of these specific properties, there are no known commercial papers that meet all three of the noted critical properties within the range identified above.

Embodiments of the invention identify specific critical properties for improved toner adhesion and image permanence, and optimize the identified specific critical properties. More specifically, the optimum paper for xerographic DCPP preferably comprises a paper specification having at least a thermal diffusivity less than approximately 8.5 mm$^2$/s, a polar liquid contact angle slope of less than approximately −12.0, and/or a non-polar liquid contact angle slope of less than approximately −5.5.

In another embodiment of the invention a method of printing gloss coated paper in an electrophotographic apparatus includes providing electrophotographic toner, and forming an image on gloss coated paper, wherein the gloss coated paper has at least a thermal diffusivity of less than approximately 8.5 mm$^2$/s, a polar contact angle slope of less than approximately −12.0 and/or a non-polar contact angle slope of less than approximately −5.5.

BRIEF DESCRIPTION OF THE DRAWINGS

The response referred to in the following figures is a measure of toner adhesion using a scratch indenter device.

DETAILED DESCRIPTION OF PREFERRED EMBODIMENTS

Figure 1:
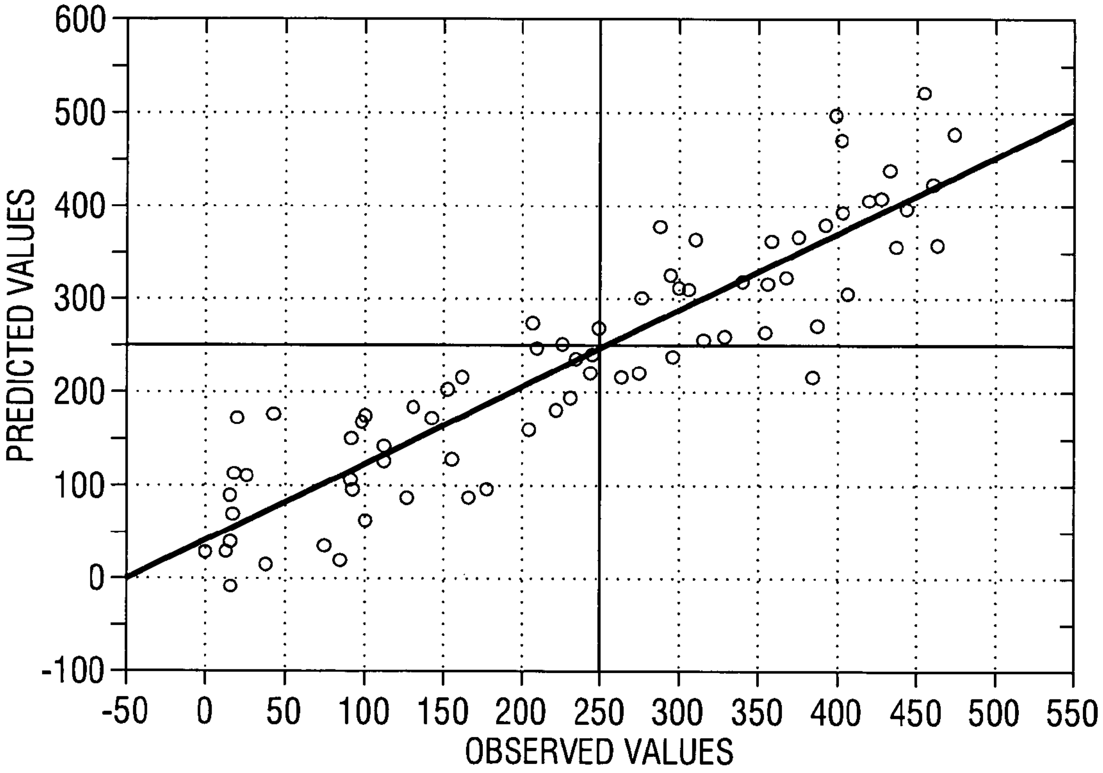
FIG. 1 illustrates a chart of an observed versus predicted scatter plot in a central composite response surface model based on gloss coated paper properties of 30 paper samples in an embodiment of the present invention.

In printing and copying machines, a digital electrophotographic method has been widely adopted as a method which can provide both high speed and a high image quality. In this method, a light beam which is adjusted to a predetermined spot diameter in an image optical system is used for scanning of a photosensitive member. A latent image in an area modulation mode which corresponds to an image density signal is formed on the photosensitive member. The area modulation is modulated by an ON/OFF time duration of the light beam corresponding to the image density signal determined by a pulse duration modulation means. The latent image is visualized by a toner and image forming is thus completed.

A process for forming an image in which a toner image is formed is not limited to electrophotography, but the process may be a process in which a toner flies directly onto a toner image carrier according to an image data already receiving digital processing and thereafter a toner image is formed on the toner image carrier.

The image forming process may also be a process in which a magnetic latent image is formed on a toner image carrier according to an image data already receiving digital processing and the toner image is formed according to the magnetic image on the toner image carrier.

The image forming process may also be a process in which an electrostatic latent image is formed by writing a charge image directly on a toner image carrier according to an image data already receiving digital processing. The toner image is thereafter formed on the toner image carrier according to the electrostatic latent image. The toner images thus formed on the toner image carrier are temporarily transferred on an intermediate transfer member and subsequently, the toner image is further transferred on a recording medium for simultaneous transfer and/or fixing.

The imaging forming process typically employs an initial step of charging a photoconductive member to a substantially uniform potential and thereafter exposing the photoconductive member to record the latent image. A print engine in the image forming system has at least four developer stations. Each developer station has a corresponding developer structure. Each developer structure preferably contains one of magenta, yellow, cyan or black toner. The print engine may include additional developer stations having developer structures containing other types of toner such as MICR (magnetic ink character recognition) toner. The print engine may also include one, two or three developer structures having one, two or three different types of toner, respectively. Each of the developer stations is preferably preceded by an exposure process. Further, each of the developer stations preferably includes a corresponding dispenser for supplying toner particles to the developer structure. Preferably, each developer station is applying a different type of toner to the latent image.

In an embodiment of the present invention, gloss coated papers are used. Gloss coated papers are comprised of a substrate with a gloss coating, thereon. Simply stated, to make gloss coated paper, a gloss imparting material, mineral pigment plus binder, replaces one or both surfaces of a base stock through a coating process. The base stock with the added material is then calendared though a series of smooth metal rollers which polish the material to produce a smooth gloss coated sheet.

Gloss coating is comprised of a blend of white opaque pigments, typically mineral pigments such as kaolin clay and calcium carbonate, combined with a level of binder, either natural binder such as some form of starch or chemically modified starch, or synthetic binder, typically styrene-butadiene or styrene acrylic or acrylic latex, plus other components including natural or synthetic cobinders, rheology modifiers, crosslinkers, lubricants, defoaming agents, preservatives, dispersants, which is applied to a suitable paper base sheet using bent blade or bevel blade or air-knife or transfer roll or other coating process, formulated to provide a highly uniform, smooth surface optimized for printing application in terms of such parameters as sheet gloss, print gloss, ink receptivity, print resolution, etc. Following application to the sheet the coating is dried and then gloss is developed using some form of calendaring technology which may include supercalendering, gloss calendering, soft-nip calendaring over a wide range of application temperatures and pressures. Gloss coated grades typically include papers as described above having gloss values in the range 60–80 degrees (Gardiner gloss at 75° angle).

In an embodiment of the present invention, a set of properties for optimal toner adhesion to gloss coated papers in xerographic DCPP are defined. In particular, three critical properties characterize three fundamental aspects of coated paper, which include thermal transfer through coated paper, surface chemistry at coated paper surface, and interaction with liquids. In one embodiment, the interaction with liquids includes consideration of both surface topography, pore size distribution and pore structure.

Suitable coated papers require low thermal diffusivity. Thus, the heat supplied by the fuser roll during fusing should remain at the paper/fuser roll interface where it is available to coalesce and adhere toner to paper. At the same time, suitable coated papers require an "open" structure with respect to wetting and penetration of both polar and non-polar liquids. In a material as complex and structurally heterogeneous as paper, thermal diffusivity has various factors including thermodynamic wetting and spreading, surface topography and coated surface pore size and structure distribution.

In order to identify the critical properties which increase toner adhesion to improve image permanence, approximately 30 commercial gloss coated papers (hereinafter referred to as "sample papers"), ranging in grammage from 120–275 gsm, were collected and their properties measured to determine each of the sample papers specific attributes. In general, most of the properties of the sample papers were measured using known Technical Association of Pulp and Paper Industry (TAPPI) methods, such as TAPPI 405.

The following table lists the included sample papers.

| | GRADE | MANUFACTURER |
|---|---|---|
| 1. | McCoy Gloss | SAPPI |
| 2. | Carolina Cover | International Paper |
| 3. | Opus Gloss | SAPPI |
| 4. | Mead Gloss | Mead Westvaco |
| 5. | Cornwall Coated Cover | Domtar |
| 6. | Alterego Gloss | ArjoWiggins |
| 7. | Corniche Gloss | |
| 8. | Lustrogloss | SAPPI |
| 9. | Xerox Digital Cover Gloss | Xerox |
| 10. | Productolith | Stora Enso |
| 11. | Centura Gloss | Stora Enso |
| 12. | Celestial Gloss | |
| 13. | Northwest Gloss | Potlatch |

Extensive experiments were conducted to assess the xerographic DCPP toner adhesion for each sample paper. In particular, the thermal properties, the surface thermodynamic properties, the surface roughness, the grammage, the caliper and the apparent density of each sample paper were measured. Following is a table which summarizes a minimum value, a maximum value, and a mean value of 28 different properties of the sample papers that were measured.

Descriptive Statistics (gloss coated data in gloss coated grades)

| | Mean | Minimum | Maximum | Units |
|---|---|---|---|---|
| grammage | 201.22 | 118.50 | 277.10 | g/m$^2$ |
| Caliper | 178.56 | 93.60 | 277.90 | microns |
| Apparent density | 1.15 | 0.86 | 1.29 | g/cm$^3$ |
| 75° gloss | 71.48 | 60.20 | 77.90 | GGU |
| Parker Print Surf | 1.08 | 0.40 | 1.73 | microns |
| Dynamic Roughness | 1.74 | 1.18 | 2.47 | microns |
| Heat Capacity (25° C.) | 1.17 | 1.07 | 1.28 | J/g/° C. |
| Heat Capacity (50° C.) | 1.27 | 1.16 | 1.40 | J/g/° C. |
| Heat Capacity (75° C.) | 1.36 | 1.25 | 1.51 | J/g/° C. |
| Heat Capacity (100° C.) | 1.43 | 1.32 | 1.57 | J/g/° C. |
| Thermal Diffusivity (25° C.) | 0.09 | 0.08 | 0.13 | mm$^2$/s |
| Thermal Diffusivity (50° C.) | 0.10 | 0.08 | 0.13 | mm$^2$/s |
| Thermal Diffusivity (100° C.) | 0.09 | 0.07 | 0.12 | mm$^2$/s |
| Thermal Conductivity (25° C.) | 0.13 | 0.09 | 0.18 | W/m° K |
| Thermal Conductivity (50° C.) | 0.14 | 0.11 | 0.20 | W/m° K |
| Thermal Conductivity (100° C.) | 0.15 | 0.12 | 0.21 | W/m° K |
| Water contact angle (0.1 s) | 79.11 | 59.90 | 97.80 | degree |
| Water contact angle (1.0 s) | 69.84 | 55.50 | 85.30 | degree |
| Water contact angle (10 s) | 64.19 | 50.40 | 77.10 | degree |
| Water contact angle slope | −7.34 | −12.05 | −3.35 | deg/log(s) |
| Formamide contact angle (0.1 s) | 67.82 | 50.10 | 84.10 | degree |
| Formamide contact angle (1.0 s) | 59.91 | 43.90 | 78.90 | degree |
| Formamide contact angle (10 s) | 53.04 | 41.40 | 66.30 | degree |
| Formamide contact angle slope | −7.39 | −13.15 | −3.50 | deg/log(s) |
| Diiodomethane contact angle (0.1 s) | 45.40 | 38.50 | 63.40 | degree |
| Diiodomethane contact angle (1.0 s) | 43.02 | 35.60 | 60.30 | degree |
| Diiodomethane contact angle (10 s) | 39.49 | 30.10 | 51.90 | degree |
| Diiodomethane contact angle slope | −2.95 | −5.75 | −0.15 | deg/log(s) |

With respect to identifying the above statistics for grammage, samples were made using a 700 cm$^2$ sample punch from L&W and weighed according to TAPPI standard T410. Results are reported as grams/square meter. Caliper samples were measured according to TAPPI T411 on single sheets using an L&W micrometer. Apparent density was calculated from grammage and caliper measurements described above. 75° Gloss was measured using BYK-Gardiner Micro-Gloss 75 instrument according to TAPPI standard T480. Three measurements were made in each direction—MD and CMD—on a sheet of paper and the overall average reported. Parker Print-Surf measurements taken according to TAPPI T555 were made using a Messmer PPS instrument with a 1.0 mPa load (148 psi) and the 'soft' backing. Both sides of C2S papers were measured and the average of 3 readings per side reported separately as side A and side B.

The dynamic roughness Rp was measured on samples conditioned 24 hours in B zone. The instrument is a Micro-Topograph manufactured by Toyo Seiki. The loading pressure of paper to prism is variable and in our experiment tests were made using loading pressures of 10, 15 and 20 kg/cm$^2$ (142, 213, 284 psi). Furthermore the Rp value is dynamic since it is measured at 10 ms intervals after the loading piston is applied from 10–50 ms. Values for dynamic roughness reported in this work are the average of 40 and 50 ms results for each of 5 separate tests conducted on a sheet of paper. The 10 and 20 ms results indicate a transient response, i.e. how the paper compresses in response to applied load, that was not included in this work.

Heat capacity was measured using a TA Q1000 Differential Scanning Calorimeter. Samples of approximately 15–20 mg cut from sheets of paper were run in modulated DSC scan over temperature range −20 to 140° C. The procedure was as follows: (1) sampling interval 1.00 s/pt; (2) zero heat flow at the midpoint of the test temperature range, 60° C.; (3) equilibrate at −20° C.; (4) isothermal for 5.00 min; (5) modulate +/−0.500° C. every 100 s; (6) ramp 5° C./min to 140° C. Reversible, non-reversible and total heat capacity was measured. In this work the value reported is reversible heat capacity interpolated at 4 temperatures −25, 50, 75 and 100° C. for each paper.

Thermal diffusivity was measured by laser flash diffusivity using a Netzsch Nanoflash LFA447. Discs 13 mm diameter were cut from the sample paper and coated both sides with a graphite spray coating applied from a handheld aerosol can. The coating enhances absorption of laser energy and the emission of IR radiation to the detector, as well as eliminates the reflective effect of the paper sample. Spray-coated samples are placed in the instrument where they are exposed on one side to a xenon flashtube pulse. An $LN_2$ cooled InSb IR detector measures temperature as heat and is transmitted through the sample. The resulting temperature-time curve is analyzed using a version of Parker analysis:

$$t_{50} = \frac{0.1388\, d^2}{\alpha};$$

where d=sample thickness, α=thermal diffusivity, and $t_{50}$=time span to reach 50% peak temperature value;

modified by Cowan (1962) to account for heat loss from both the front and back face of the sample.

Thermal conductivity is calculated from diffusivity, heat capacity and apparent density:

$$\lambda=\alpha\rho C_p$$

where λ=thermal conductivity, α=thermal diffusivity, ρ=apparent density and $C_p$=heat capacity.

Each sample disc is exposed to 5 successive flashtube pulses or 'shots'; diffusivity is determined for each of the of the 5 shots and the average value obtained for the sample disc; for each paper 4 samples are evaluated in this manner. The value reported for the paper is the overall average of 5 shots×4 sample discs. Thermal diffusivity and conductivity are measured using the Nanoflash at 25, 50 and 100° C. on unconditioned graphite spray-coated samples.

Contact angles on the paper samples were measured in accordance with TAPPI T558 using a DAT 1100 instrument from Fibro Systems AB. Liquid is pumped through a capillary tube vertically suspended above the paper sample where it forms a 4 μl pendant drop. A pulse is delivered to the tube to release the drop to the paper sample. A CCD camera captures drop images every 0.02 s and drop shape analysis is used to determine contact angle. In this work contact angles are reported at 0.1, 1.0 and 10 s after drop delivery to paper surface. Eight drops are delivered successively to a strip of paper cut at 45° angle to sheet edge, i.e. halfway between CD and CMD and the contact angle determined for each drop. For each paper 2 strips are evaluated, so the final number reported is an average of 8 drops×2 strips measurements.

Further, to study the possible effect of Surface Free Energy (SFE) components on toner adhesion, three liquids were employed: Water (Milli-Q RG Ultra-pure water system, XRCC A/N 07853); Formamide (99.5+%) and Diiodomethane (99%).

Thermal properties including heat capacity, thermal conductivity, and thermal diffusivity were each measured at 25° C., 50° C. and 100° C. using differential scanning calorimetry (DSC) and laser flash diffusivity.

In order to measure the surface thermodynamic properties, the contact angle for three solvents over a range of 0.1–10 seconds was measured and the dispersive and polar surface free energy components were calculated. In one embodiment, the dispersive and polar surface free energy components were calculated using the Vu geometric mean method, which is a technique for determining surface energy.

The surface roughness was measured using the Parker Print-Surf (PPS) method. However, other surface roughness methods could also be used, such as, for example, the Gardner gloss method, the Toyo-Seiki Topography dynamic roughness method, and the like.

Each sample paper was imaged using a control black toner in a control carrier of a digital color printer (test fixture). Toner mass per unit area (TMA) was controlled to 0.5+/−0.5 mg/cm$^2$ for each sample paper by making frequent gravimetric TMA measurements. The images were then fused on the test fixture at a speed of 92 ft/min and at fusing temperatures of 345° F., 365° F. and 385° F. Toner adhesion was measured for each sample paper using a modified Taber model 5700 Linear Abraser (i.e., a scratch indentation test). In particular, the preferred scratch test achieved by modification was developed through experimentation by controlling the load weight, the load rate, tip hardness and tip sharpness. The resulting scratched toner images were measured using a camera-based image analysis system in which the scratch-indent response, indicative of toner adhesion or image permanence, is the pixel count for toner removed relative to the corresponding unscratched toner image area threshold. Extensive work was undertaken to correlate this pixel count 'scratch area' to the results of panels of people scratching toner-based prints and evaluating their results against quality expectations for image permanence. In the resulting scratch-indent image permanence test a lower number indicates better toner adhesion, values less than 300 are generally considered acceptable in most applications, while values less than 100 are optimal.

Toner adhesion for all the sample papers was measured using the scratch test and their respective paper properties analyzed. Analysis of these results led to a gloss coated paper with optimum toner adhesion.

More specifically, central composite response surface models were used to fit various sets of fusing and gloss coated paper properties to a response variable of toner adhesion, in order to resolve the 'variable selection problem' familiar to empirical modeling analyses, i.e., determine the optimal model. Selected models, relative to both statistical and physical significance, employed the following factors: fusing temperature, grammage, change in the slope of non-polar liquid contact angle over the interval from 0.1 to 10 s, and thermal diffusivity. A number of indicators were employed to navigate through the variable selection problem, including 1) coefficient of multiple determination $Rp^2$, 2) Adjusted $R^2$, and 3) Mean Square Residual. These methods will be familiar to those skilled in empirical modeling and the design and analysis of experiments and may be found in any standard text on the subject. An example showing various models leading to the selected model is shown in the following table.

| | Image Permanence Predictors | | | | | | |
|---|---|---|---|---|---|---|---|
| | 1 | 2 | 3 | 4 | $R^2$ | $R^2$-adj | MSR |
| A | Fuser temperature | | | | 0.272 | 0.262 | 15330 |
| B | | Grammage | | | 0.312 | 0.303 | 14485 |
| C | Fuser temperature | Grammage | | | 0.595 | 0.578 | 8768 |
| D | Fuser temperature | Grammage | Thermal Diffusivity 25° C. | | 0.669 | 0.64 | 7484 |
| E | Fuser temperature | Grammage | | Rate of change of water contact angle | 0.722 | 0.698 | 6275 |
| F | Fuser temperature | Grammage | Thermal Diffusivity 25° C. | Rate of change of formamide contact angle | 0.731 | 0.689 | 6451 |
| G | Fuser temperature | Grammage | Thermal Diffusivity 25° C. | Rate of change of water contact angle | 0.761 | 0.724 | 5730 |
| H | Fuser temperature | Grammage | Thermal Diffusivity 25° C. | Rate of change of diiodomethane contact angle | 0.768 | 0.732 | 5571 |

-continued

| | Image Permanence Predictors | | | | | | |
|---|---|---|---|---|---|---|---|
| | 1 | 2 | 3 | 4 | $R^2$ | $R^2$-adj | MSR |
| I | Fuser temperature | Grammage | Thermal Diffusivity 50° C. | Rate of change of water contact angle | 0.789 | 0.754 | 5154 |
| J | Fuser temperature | Grammage | Thermal Diffusivity 100° C. | Rate of change of diiodomethane contact angle | 0.819 | 0.79 | 4413 |
| K | Fuser temperature | Grammage | Thermal Diffusivity 50° C. | Rate of change of diiodomethane contact angle | 0.823 | 0.794 | 4319 |

Figure 2:
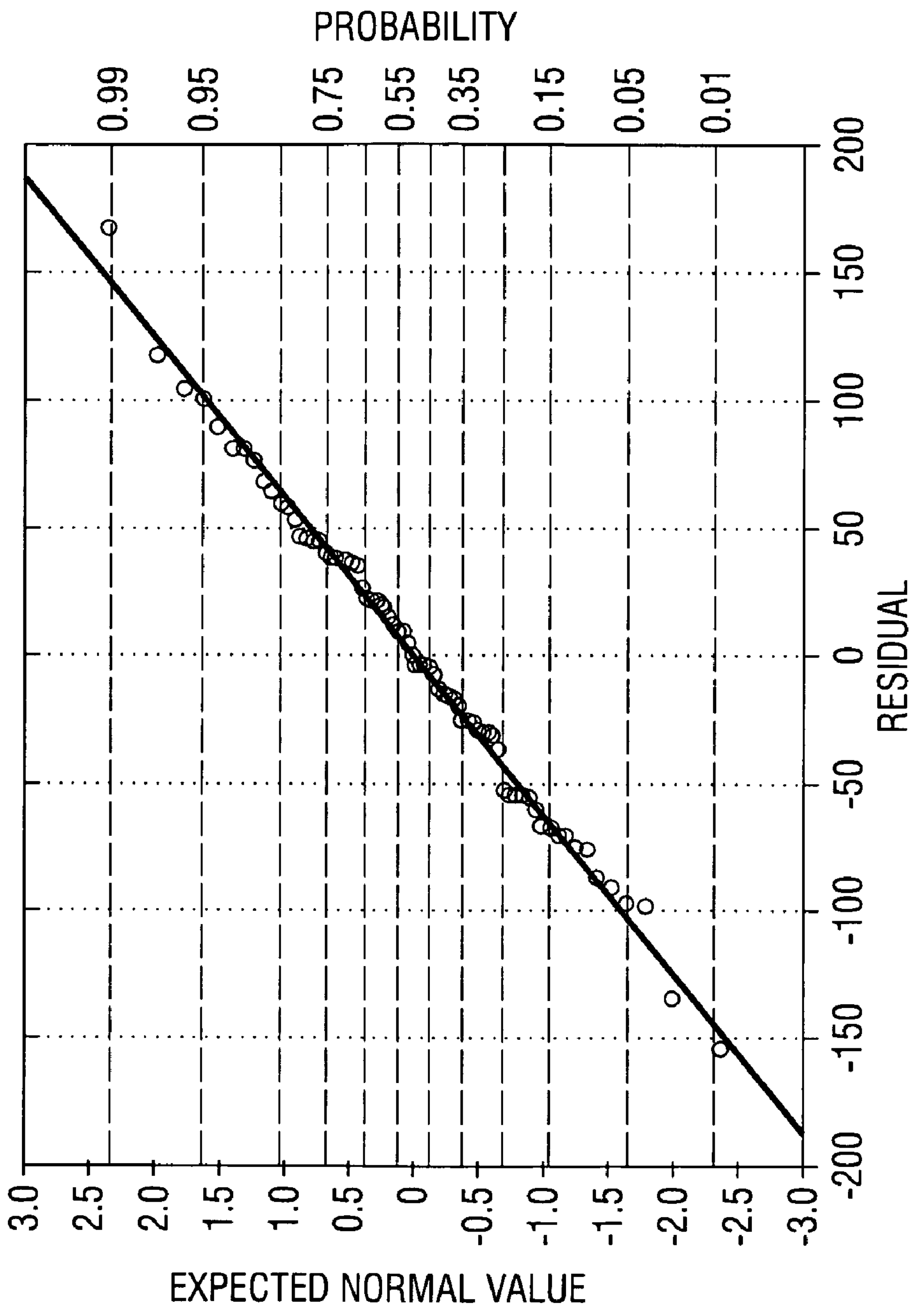
FIG. 2 illustrates a chart of a normal probability plot of residuals in a central composite response surface model based on gloss coated paper properties of 30 paper samples in an embodiment of the present invention.

The correlation coefficient ($r^2$) (observed/predicted) for the selected model is 82.3% and the residuals were reasonable normally distributed as shown in the charts for FIGS. 1 and 2.

Model K, in an exemplary embodiment, allows for the identification of grammage, fusing temperature, thermal diffusivity and diiodomethane contact angle slope as critical properties of gloss coated papers with respect to determining toner adhesion and illustrates how to optimize both these properties to improve toner adhesion.

Figure 3:
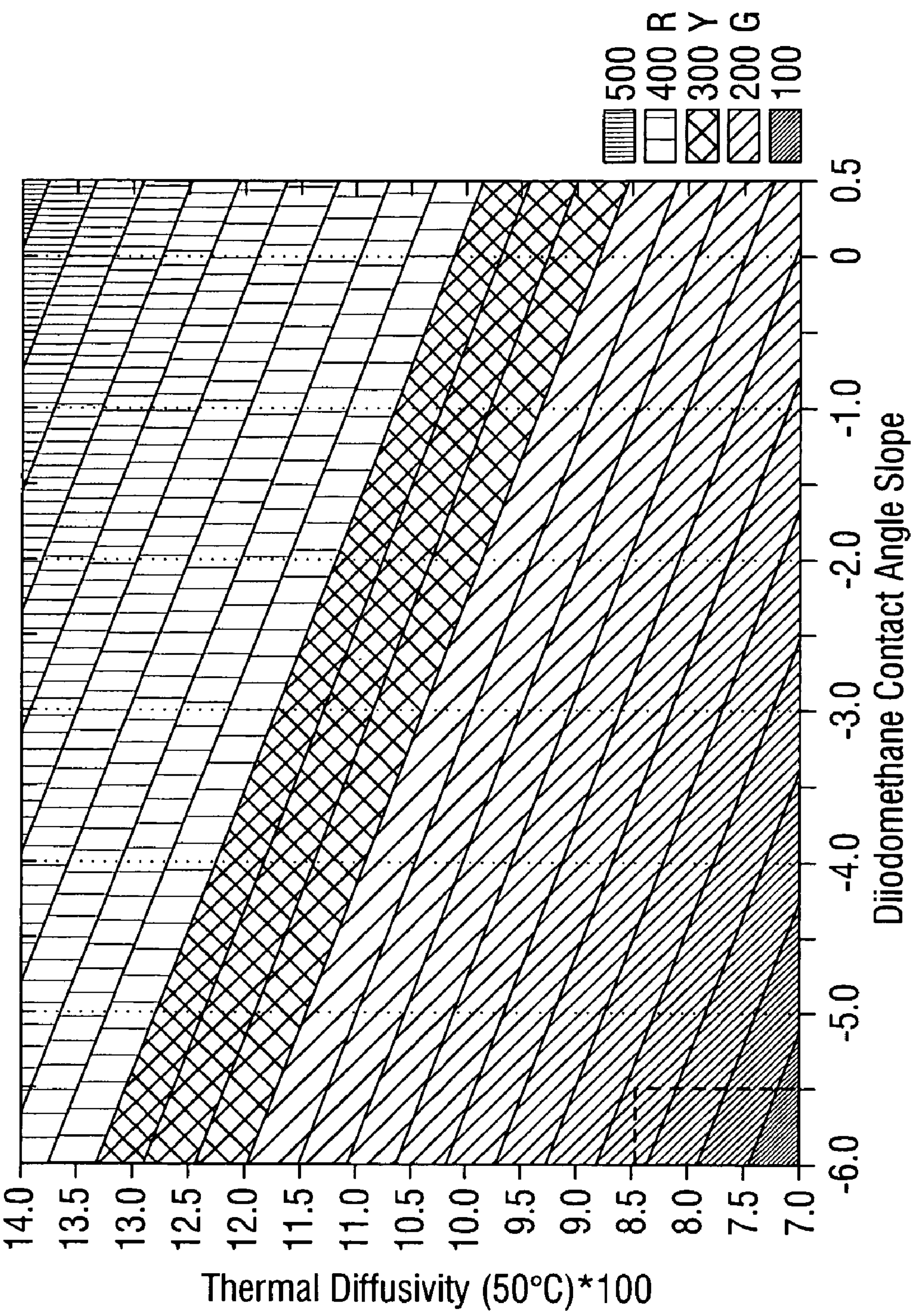
FIG. 3 illustrates a chart of thermal diffusivity versus diiodomethane contact angle slope in a central composite response surface model based on gloss coated paper properties of 30 paper samples in an embodiment of the present invention.

Further, as illustrated in FIG. 3 a response surface plot from the preferred embodiment indicates that higher negative diiodomethane contact angle slope and lower thermal diffusivity improve toner adhesion on gloss coated papers. Here, the diiodomethane contact angle slope is a phenomenological parameter combining coated surface energy, porosity and roughness.

Based on the above described models, the paper specifications for gloss coated papers to meet the requirement for optimal toner adhesion, particularly with respect to the formation of images using xerographic DCPP, comprise the critical properties of thermal diffusivity and diiodomethane (non-polar) contact angle slope.

Figure 4:
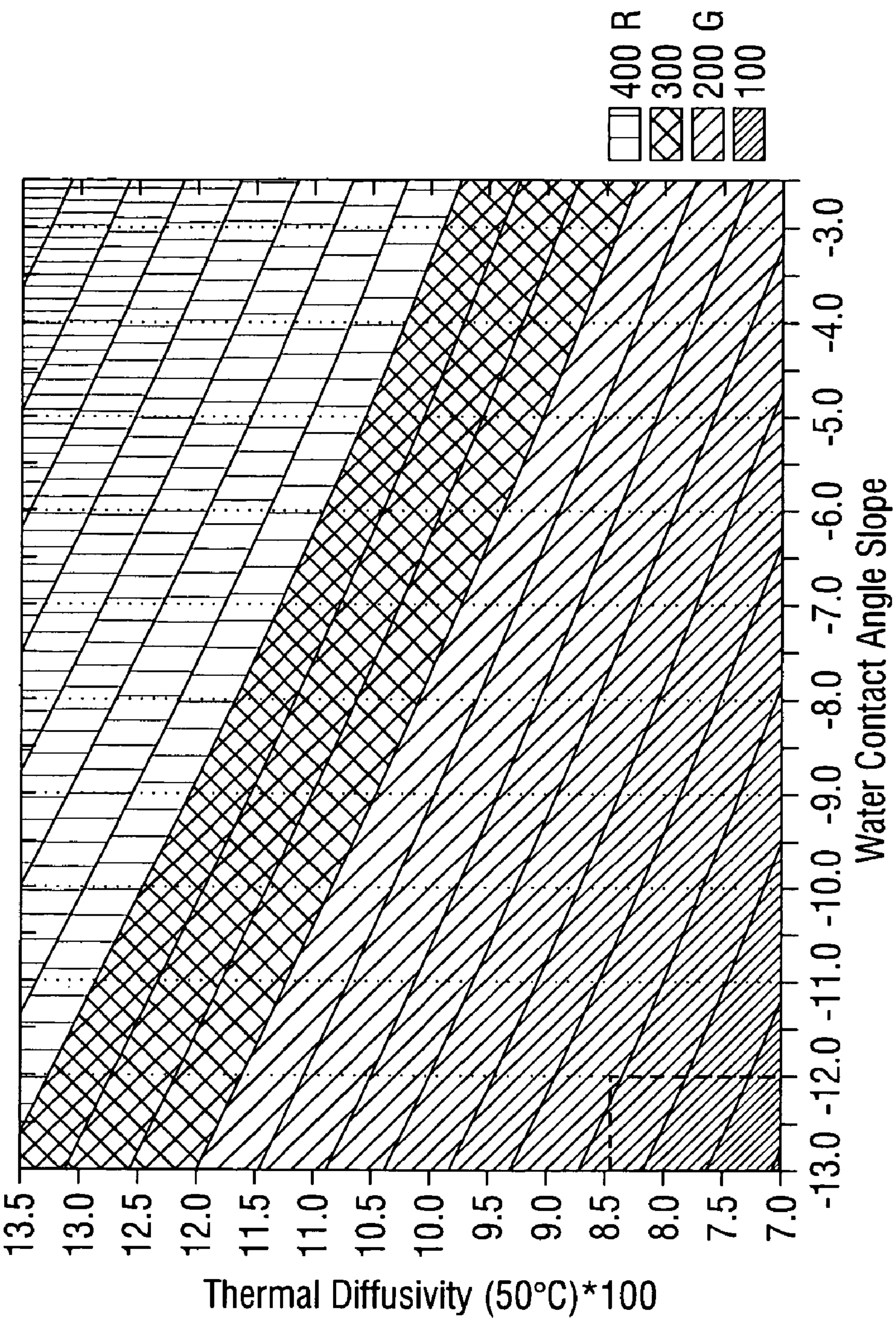
FIG. 4 illustrates a chart of a thermal diffusivity versus water contact angle slope in a central composite response surface model based on gloss coated paper properties of 30 paper samples in an embodiment of the present invention.

It is understood that the interaction of paper, coated or uncoated, with water is of considerable practical significance and furthermore constitutes a property routinely measured during paper manufacture quality control, which is not the case for a non-polar liquid such as diiodomethane. Therefore a second embodiment of the invention is proposed replacing diiodomethane contact angle slope with water contact slope. This model is represented by model I on the preceding table. While the overall model fit is slightly less than for model K, it is considered acceptable, and the practical significance of water contact angle slope is important enough to identify this as a second embodiment of the invention. Furthermore the response to polar liquids (water) and non-polar liquids (diiodomethane) is similar, i.e. in both cases larger negative contact angle slopes is preferred. This is represented in FIG. 4 which shows the scratch-indenter response for thermal diffusivity and water contact slope.

More specifically, in the two embodiments, the gloss coated paper to meet the requirement for optimal toner adhesion may include the following properties: (1) grammage between 120 and 275 gsm; (2) caliper between 90 and 280 microns; (3) gloss between 60 and 80 ggu; (4) PPS between 0.4 and 2.0 microns; (5) thermal diffusivity (measured at 50° C.) less than 8.5 $mm^2/s$; (6) water contact angle slope (polar liquid) less than −12.0; and/or (7) diiodomethane contact angle slope (non-polar liquid) less than −5.5.

In an embodiment of the present invention, thermal diffusivity, water contact angle slope and diiodomethane contact angle slope having the critical properties described above, provide gloss coated paper with optimal toner adhesion. Specific property parameters of these three critical properties are identified above in order to further optimize toner adhesion on the gloss coated paper. None of the commercially available sample papers include the combination of all three of these critical properties.

The advantage of gloss-coated papers manufactured to meet the set of properties identified in an embodiment of the present invention, in either the nonpolar (diiodomethane) or polar (water) embodiment, is optimal image permanence measured as toner adhesion using a scratch indentation device.

It is envisioned that the papers described herein could be advantageous in other applications involving the thermal fusing of thermoplastic resins to coated papers or paperboard. For example, the set of properties discussed herein may describe optimal conditions for the glueability of coated paperboard, a common problem in the flexible packaging industry.

Accordingly, while this invention has been described in conjunction with specific embodiments described above, it is evident that many alternatives, modifications and variations will be apparent to those skilled in the art. The preferred embodiments of the invention, as set forth above, are intended to be illustrative and not limiting. Various changes may be made without departing from the spirit and scope of the invention.

What is claimed is:

1. A gloss coated paper comprising a paper sheet with a gloss-imparting material on at least one surface of the paper sheet, the gloss coated paper having at least:

a thermal diffusivity of less than approximately 8.5 $mm^2/s$;

a polar contact angle slope of less than approximately −12.0; and a non-polar contact angle slope of less than approximately −5.5.

2. The gloss coated paper according to claim 1, wherein the polar contact angle slope is a water contact angle slope.

3. The gloss coated paper according to claim 1, wherein the non-polar contact angle slope is a diiodomethane contact angle slope.

4. The gloss coated paper according to claim 1, wherein the gloss coated paper further has a grammage in the range of about 120–275 gsm.

5. The gloss coated paper according to claim 1, wherein the gloss coated paper further has a caliper in the range of about 90–280 microns.

6. The gloss coated paper according to claim 1, wherein the gloss coated paper further has a gloss in the range of about 60–80 ggu.

7. The gloss coated paper according to claim 1, wherein the gloss coated paper further has a surface roughness using a Parker Print Surf in the range of about 0.4–2.0 microns.

8. A method of printing gloss coated paper in an electrophotographic apparatus comprising:

forming an image with an electrophotographic toner in the electrophotographic apparatus; and transferring the image to a gloss coated paper comprising a paper sheet with a gloss-imparting material on at least one surface of the paper sheet, the gloss coated paper having at least:

a thermal diffusivity of less than approximately 8.5 $mm^2/s$;

a polar contact angle slope of less than approximately −12.0; and a non-polar contact angle slope of less than approximately −5.5.

9. The method according to claim 8, wherein the polar contact angle slope is a water contact angle slope.

10. The method according to claim 8, wherein the non-polar contact angle slope is a diiodomethane contact angle slope.

11. The method according to claim 8, wherein the gloss coated paper further has a grammage in the range of about 120–275 gsm.

12. The method according to claim 8, wherein the gloss coated paper further has a caliper in the range of about 90–280 microns.

13. The method according to claim 8, wherein the gloss coated paper further has a gloss in the range of about 60–80 ggu.

14. The method according to claim 8, wherein the gloss coated paper further has a surface roughness using a Parker Print Surf in the range of about 0.4–2.0 microns.

15. The method according to claim 8, wherein the electrophotographic apparatus is a copying device.

16. The method according to claim 8, wherein the electrophotographic apparatus is a facsimile device.

17. The method according to claim 8, wherein the electrophotographic apparatus is a printer.

18. The method according to claim 17, wherein the printer is a digital color production printer.

19. The method according to claim 8, wherein the step of forming the image with the electrophotographic toner includes providing toner specific for at least one of the electrophotographic apparatus and the gloss-coated paper.

20. The method according to claim 8, wherein the step of forming the image with the electrophotographic toner includes providing toner not that is not specific to at least one of the electrophotographic apparatus and the gloss coated paper.

* * * * *